United States Patent [19]

Summo

[11] 4,326,903

[45] Apr. 27, 1982

[54] METHOD FOR SECURING PARTS TOGETHER BY ULTRASONIC ENERGY

[75] Inventor: Arthur M. Summo, Londonderry, N.H.

[73] Assignee: Branson Ultrasonics Corporation, Newton, Conn.

[21] Appl. No.: 213,417

[22] Filed: Dec. 5, 1980

[51] Int. Cl.³ .................... B23K 19/04; B32B 31/20
[52] U.S. Cl. .................... 156/73.1; 156/580.1; 156/580.2; 227/51; 228/1 R; 228/110; 264/23
[58] Field of Search ............. 156/73.1, 73.5, 73.6, 156/580.1, 580.2; 227/51; 264/23; 228/1 R, 110

[56] References Cited

U.S. PATENT DOCUMENTS

| | | | |
|---|---|---|---|
| 3,367,809 | 2/1968 | Soloff | 156/73.1 |
| 3,497,941 | 3/1970 | Moll | 228/111 |
| 3,499,808 | 3/1970 | Obeda | 156/580.2 |
| 3,813,006 | 5/1974 | Holze, Jr. et al. | 228/1 R |
| 3,908,886 | 9/1975 | Raske | 228/1 R |
| 4,019,876 | 4/1977 | Stöckel et al. | 228/110 |

Primary Examiner—Michael G. Wityshyn
Attorney, Agent, or Firm—Ervin B. Steinberg; Philip J. Feig

[57] ABSTRACT

A method for securing a thermoplastic part to another part by applying ultrasonic energy to a projection of the thermoplastic part in a direction substantially normal to the longitudinal axis of the projection. The exposed end of the projection is urged into an open cavity disposed in a side wall of a horn adapted to undergo ultrasonic vibrations. The cavity further is disposed substantially at an antinodal region of longitudinal motion of the horn and oriented normal to the direction of longitudinal motion of the horn. The horn is rendered resonant along its longitudinal axis while the exposed end concomitantly is urged into the cavity.

4 Claims, 4 Drawing Figures

METHOD FOR SECURING PARTS TOGETHER BY ULTRASONIC ENERGY

BRIEF SUMMARY OF THE INVENTION

This invention refers to a method for securing thermoplastic parts to other parts. More specifically, this invention refers to a method for securing a thermoplastic part to another part by means of the application of ultrasonic energy.

It is often desired to secure a part formed of a thermoplastic material to another part which may or may not also be of a thermoplastic material.

The use of high frequency vibratory energy for securing parts together is well known in the art. For instance, U.S. Pat. No. 3,367,809, entitled "Sonics" issued to Robert S. Soloff, dated Feb. 6, 1968 and U.S. Pat. No. 3,499,808, entitled "Method and Apparatus for Securing Parts together by Sonic Energy" issued to Edward G. Obeda, dated Mar. 10, 1970, disclose a method and apparatus for securing a thermoplastic part to another part by applying sonic energy to a projection of the thermoplastic part and causing deformation thereof, such as peening over. One or more upstanding projections in the form of bosses or studs of a thermoplastic part are placed through corresponding apertures in another part, which is to be fastened to the thermoplastic part, and subseqently sonic energy is coupled to the protruding free end of the projections. By virtue of the dissipation of sonic energy, the thermoplastic projections soften and the tool or horn which provides the sonic energy and is in contact with the free end of the projection flattens the softened thermoplastic projection, obtaining a peening over effect. In both of these prior art methods and devices the vibratory energy is applied in a direction parallel to the longitudinal axis of the upstanding thermoplastic projection.

The present invention concerns the securing together of parts by means of the application of high frequency vibratory energy in a direction substantially normal to the longitudinal axis of the upstanding thermoplastic projection. In order to achieve the securing together, a horn adapted to undergo ultrasonic vibrations at a frequency in the range between one and 100 kHz is provided and includes a cavity disposed in a side wall of the horn in a direction normal to the longitudinal axis of the horn. The cavity further is disposed substantially at an antinodal region of longitudinal motion of the horn.

In the present method, the parts are placed into juxtaposition with the projection extending from the thermoplastic part. The free end of the projection is urged by a static force into the cavity in a direction normal to the direction of longitudinal motion of the horn. The horn is then caused to vibrate at a high frequency thereby causing a softening and flowing of the thermoplastic material in the cavity concomitantly with the projection being urged into the cavity. The ultrasonic energy, therefore, is applied to the free end in a direction substantially normal to the longitudinal axis of the upstanding thermoplastic projection. Upon ceasing the high frequency vibratory motion of the horn, the softened and flowed material solidifies and conforms to the shape of the cavity. The present invention generally encompasses frequencies in the range between one and 100 kHz, preferably frequencies in the range between 16 and 60 kHz. The advantage of using ultrasonic energy in the forming and securing process arises from the fact that ultrasonic vibrations aid in the deforming of thermoplastic material by causing a softening and flowing of the thermoplastic material. The material solidifies soon after the application of ultrasonic energy is stopped. Moreover, as is known when using high frequency vibratory energy, the elastic recovery of thermoplastic material when the applied forming force is removed is greatly reduced, see the book "Ultrasonic Engineering" by Julian R. Frederick, John Wiley & Son, Inc., New York, NY, 1965, page 170.

A principal object of this invention is, therefore, the provision of a new improved method for securing parts together.

Another important object of this invention is the provision of a method for securing a thermoplastic part to another part by applying high frequency vibratory energy to the free end of a projection in a direction substantially normal to the longitudinal axis of the projection extending through an opening in the other part.

Further, and still other objects of this invention will be more clearly apparent by reference to the following description when taken in conjunction with the accompanying drawings.

DETAILED DESCRIPTION OF THE INVENTION

Figure 1:
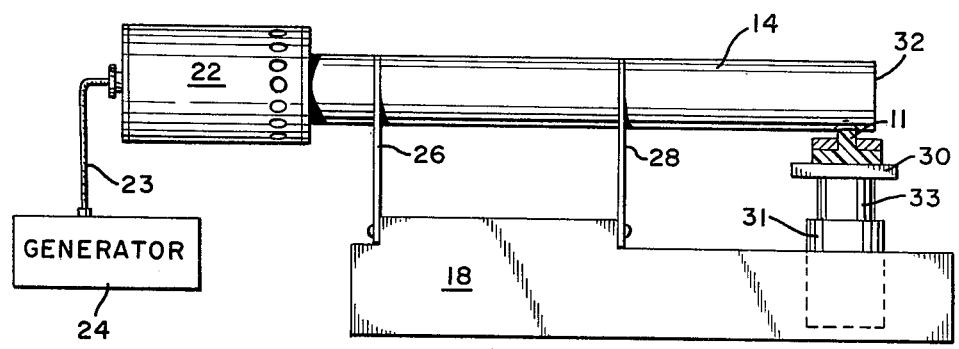
FIG. 1 is a schematic view of an apparatus useful for practicing the present invention.

Referring now to the figures and FIG. 1 in particular, numeral 22 refers to an ultrasonic energy transducer or converter which is fed from an electrical generator 24 via a conductor 23. The transducer 22, which includes either piezoelectric or magnetostrictive means for converting electrical energy applied to acoustic vibrations, is provided with a horn 14 which acts as an impedance transformer and is used generally for increasing the amplitude of longitudinal vibrations apparent at the frontal surface 32 of the horn. The horn 14 is dimensioned so that at the predetermined frequency supplied by the transducer 22 the horn will act as a half wavelength resonator for the sound traveling longitudinally therethrough, thereby causing the output surface 32 to be located at an antinodal region of longitudinal motion. The horn 14 includes an open cavity 16 which is disposed in the side of the horn in a direction substantially normal to the direction of travel of the longitudinal vibrations through the horn 14 when the horn is rendered resonant; the direction of travel of the longitudinal vibrations is shown by the double headed arrow in FIG. 2. The cavity 16 further is disposed substantially at an antinodal region of longitudinal motion of the horn 14, i.e. near the output surface 32. The shape of the cavity, for example, may be concave hemispherically domed and preferably provides a limited slip fit for an upstanding projection urged therein.

Figure 2:
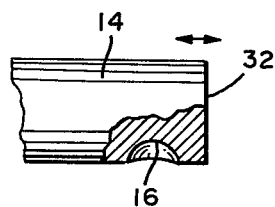
FIG. 2 is an elevational view, partly in section, of the cavity and horn providing the vibratory energy to the projection.
Figure 3:
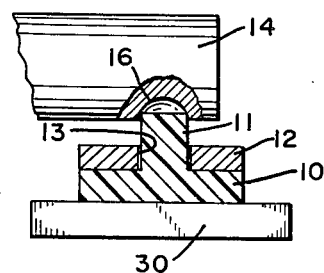
FIG. 3 is an elevational view, partly in section, of the upstanding projection of a thermoplastic part being urged into a cavity disposed in the horn prior to the application of the ultrasonic energy.

Referring also to FIGS. 2 and 3, a support plate 30 supports a workpiece 10 which comprises a polymeric theremoplastic material and is provided with one or more upstanding projections 11 to be deformed. The projection, typically, is of circular cross section and is molded integrally with the thermoplastic workpiece 10. A second workpiece, such as a plate 12, is placed in juxtaposition with the workpiece 19 so that a respective aperture 13 of the plate 12 encircles the projection 11. The projection 11 should emerge from the top surface of the second workpiece which is to be secured to the underlying workpiece 10. The free upstanding end of the projection 11 is adapted to be contacted by the surface of the cavity 16 of the horn 14 by suitable force means, for example, a hydraulic jack 31 containing a piston 33 coupled to the support plate 30. Jack 31, transducer 22 and horn 14 are supported by base 18 as shown in FIG. 1. Transducer 22 and horn 14 are supported by base 18 by means of supports 26 and 28 in a manner well known in the art.

The apparatus shown schematically in FIG. 1 is described in greater detail in U.S. Pat. No. 3,752,380, issued to Andrew Shoh, dated Aug. 14, 1973, entitled "Vibratory Welding Apparatus." The design of resonators or horns is described in Frederick supra, pages 87 to 98.

Figure 4:
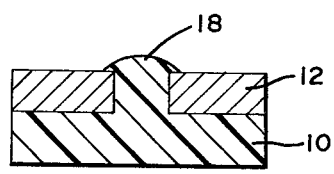
FIG. 4 is a cross-sectional view of the parts after the present method for securing has been practiced.

The free or exposed end of the projection 11 to be formed or shaped is urged by the force means into the cavity 16 in a direction normal to the direction of longitudinal motion of the horn 14. The amount of force is not critical. The horn 14 is then rendered resonant along its longitudinal axis at a predetermined frequency while the projection concomitantly is urged into the cavity to thereby cause a softening and flowing of the thermoplastic material to conform to the shape of the cavity 16. When the desired degree of shaping has been obtained, the vibratory motion of the horn 14 is stopped. However, the projection 11 for a brief dwell time is urged further toward the horn 14 thereby effecting solidification and formation of the thermoplastic material. The shaped end 18 of the projection 11 is then withdrawn from the cavity 16 and the parts are secured together as shown in FIG. 4.

Description of the Operation

The operation of the apparatus from FIG. 1 can now be visualized from the following description. The free end of the upstanding projection 11 is urged by the piston 33 into the cavity 16 in a direction normal to the direction of longitudinal motion of the horn 14. The generator 24 is energized and provides high frequency electrical energy via a cable 23 to the converter unit 22, causing the horn 14 to become resonant and vibrate, typically at 20 kHz. Concomitantly with the vibrations of the horn 14, the upstanding projection 11 of the workpiece 10 is urged further into the cavity 16 thereby causing a softening and flowing of the thermoplastic material which conforms to the shape of the cavity. When the desired degree of shaping has occurred, the generator 24 is deactivated thereby ceasing the vibrations of the horn 14. Following a brief dwell period, the projection 11 is withdrawn from the cavity 16 and the parts are secured together as is shown in FIG. 4.

When securing together parts utilizing a 3/16 inch diameter projection urged into a ¼ inch concave hemispherical cavity machined into a horn which vibrates at 20 kHz with a peak-to-peak amplitude of vibration of 0.005 inch to 0.008 inch maximum, the time for securing the parts together is approximately one second.

Moreover, it will be appreciated by those skilled in the art that the parts to be secured may be manually held and the projection 11 urged into the cavity 16 of the horn 14 coupled to the converter unit 22 supported by a suitable stand.

While there have been described and illustrated certain specific embodiment of the present invention, it will be apparent to those skilled in the art that various further changes and modifications can be made without deviating from the broad principle of the invention which shall be only limited by the scope of the appending claims.

What is claimed is:

1. A method for securing two parts to each other by means of a thermoplastic projection extending from one of the parts, said method comprising the steps of:

placing the parts into juxtaposition with the projection extending from one of the parts;

providing a horn adapted to be rendered resonant along its longitudinal axis at a predetermined frequency of vibration, said horn having a cavity disposed substantially at an antinodal region of longitudinal motion of the horn and oriented substantially normal to the direction of longitudinal motion of the horn;

urging the exposed end of the projection into the cavity in a direction normal to the direction of longitudinal motion of the horn;

rendering the horn resonant along its longitudinal axis at a predetermined frequency while concomitantly urging the end of the projection into the cavity to cause a softening and flowing of the projection until the exposed end of the projection is formed to the shape of the cavity;

ceasing rendering the horn resonant when the desired degree of forming has occurred, and thereby causing solidification of the softened and flowed material, and withdrawing the formed projection from the cavity.

2. A method for securing two parts to each other as set forth in claim 1, wherein the cavity is hemispherical.

3. A method for securing two parts to each other as set forth in claim 1, wherein the predetermined frequency of vibration is between one and 100 kHz.

4. A method for securing two parts to each other as set forth in claim 1, wherein the predetermined frequency of vibration is 20 kHz.

* * * * *